(12) United States Patent
Tahara et al.

(10) Patent No.: US 11,759,076 B2
(45) Date of Patent: Sep. 19, 2023

(54) DUST COLLECTOR

(71) Applicant: MAKITA CORPORATION, Anjo (JP)

(72) Inventors: Takayuki Tahara, Anjo (JP); Makoto Hotta, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/548,102

(22) Filed: Dec. 10, 2021

(65) Prior Publication Data

US 2022/0233044 A1 Jul. 28, 2022

(30) Foreign Application Priority Data

Jan. 22, 2021 (JP) .................................. 2021-008534

(51) Int. Cl.
| | | |
|---|---|---|
| A47L 9/28 | (2006.01) | |
| A47L 5/36 | (2006.01) | |
| A47L 9/22 | (2006.01) | |
| A47L 7/00 | (2006.01) | |
| H01M 50/244 | (2021.01) | |
| H01M 50/271 | (2021.01) | |
| H01M 50/247 | (2021.01) | |
| A47L 9/00 | (2006.01) | |

(52) U.S. Cl.
CPC ............ *A47L 9/2884* (2013.01); *A47L 5/365* (2013.01); *A47L 7/0028* (2013.01); *A47L 7/0085* (2013.01); *A47L 9/009* (2013.01); *A47L 9/22* (2013.01); *A47L 9/2857* (2013.01); *H01M 50/244* (2021.01); *H01M 50/247* (2021.01); *H01M 50/271* (2021.01); *H01M 2220/30* (2013.01)

(58) Field of Classification Search
CPC ............ H01M 50/247; H01M 50/244; H01M 50/271; H01M 2200/30; A47L 5/365; A47L 7/0028; A47L 7/0085; A47L 9/009; A47L 9/22; A47L 9/22857
USPC ............................................. 155/319; 15/319
See application file for complete search history.

(56) References Cited

U.S. PATENT DOCUMENTS

| | | | |
|---|---|---|---|
| 7,685,672 B2 * | 3/2010 | Lai .......................... | B43L 21/02 |
| | | | 15/352 |
| 8,230,540 B1 * | 7/2012 | Nelson ..................... | A47L 11/33 |
| | | | 15/83 |
| 9,420,929 B2 | 8/2016 | Hensel et al. | |

(Continued)

FOREIGN PATENT DOCUMENTS

| | | | | |
|---|---|---|---|---|
| CN | 205083391 U | * | 3/2016 | ............. A47L 5/365 |
| JP | 2018-186931 A | | 11/2018 | |
| WO | WO-2022122280 A1 | * | 6/2022 | |

OTHER PUBLICATIONS

Screen Capture of definition of the word "adjacent" from Google entitled "Dictionary," [retrieved on Jan. 14, 2023]. Retrieved from: https://www.google.com/search?q=adjacent+definition&rlz=1C1GCEB_enUS959US959&oq=adjacent+definition&aqs=chrome.0.69i59j0i512l6j69i60.5337j1j4&sourceid=chrome&ie=UTF-8 (Year: 2023).*

*Primary Examiner* — Brian D Keller
*Assistant Examiner* — Robert C Moore
(74) *Attorney, Agent, or Firm* — Oliff PLC

(57) ABSTRACT

A dust collector has a well-balanced weight. The dust collector includes a body housing, a motor located inside the body housing, a fan rotatable by the motor, and a battery mount located inside the body housing and frontward from the motor.

12 Claims, 15 Drawing Sheets

(56) References Cited

U.S. PATENT DOCUMENTS

2012/0204377 A1\* 8/2012 White .................. A47L 9/0653
   15/322
2018/0220861 A1\* 8/2018 Zhang .................. A47L 9/2884

\* cited by examiner

DUST COLLECTOR

CROSS-REFERENCE TO RELATED APPLICATIONS

This application claims the benefit of priority to Japanese Patent Application No. 2021-008534, filed on Jan. 22, 2021, the entire contents of which are hereby incorporated by reference.

BACKGROUND

1. Technical Field

The present disclosure relates to a dust collector.

2. Description of the Background

In the field of dust collectors, a rechargeable dust collector is known as described in Japanese Unexamined Patent Application Publication No. 2018-186931.

BRIEF SUMMARY

A dust collector moves on a target cleaning surface. A dust collector having an imbalanced weight may fall over when moving on a target cleaning surface.

One or more aspects of the present disclosure are directed to a dust collector having a well-balanced weight.

A first aspect of the present disclosure provides a dust collector to receive a battery pack in a detachable manner, the dust collector including:
a body housing;
a motor located inside the body housing;
a fan rotatable by the motor; and
a battery mount located inside the body housing and frontward from the motor.

The dust collector according to the above aspect of the present disclosure has a well-balanced weight.

DETAILED DESCRIPTION

Although one or more embodiments of the present disclosure will now be described with reference to the drawings, the present disclosure is not limited to the present embodiments. The components in the embodiments described below may be combined as appropriate. One or more components may be eliminated.

In the embodiments, the positional relationships between the components will be described using the directional terms such as front and rear (or forward and backward), right and left (or lateral), and up and down (or vertical). The terms indicate relative positions or directions with respect to the center of a dust collector 1.

Dust Collector

Figure 1:
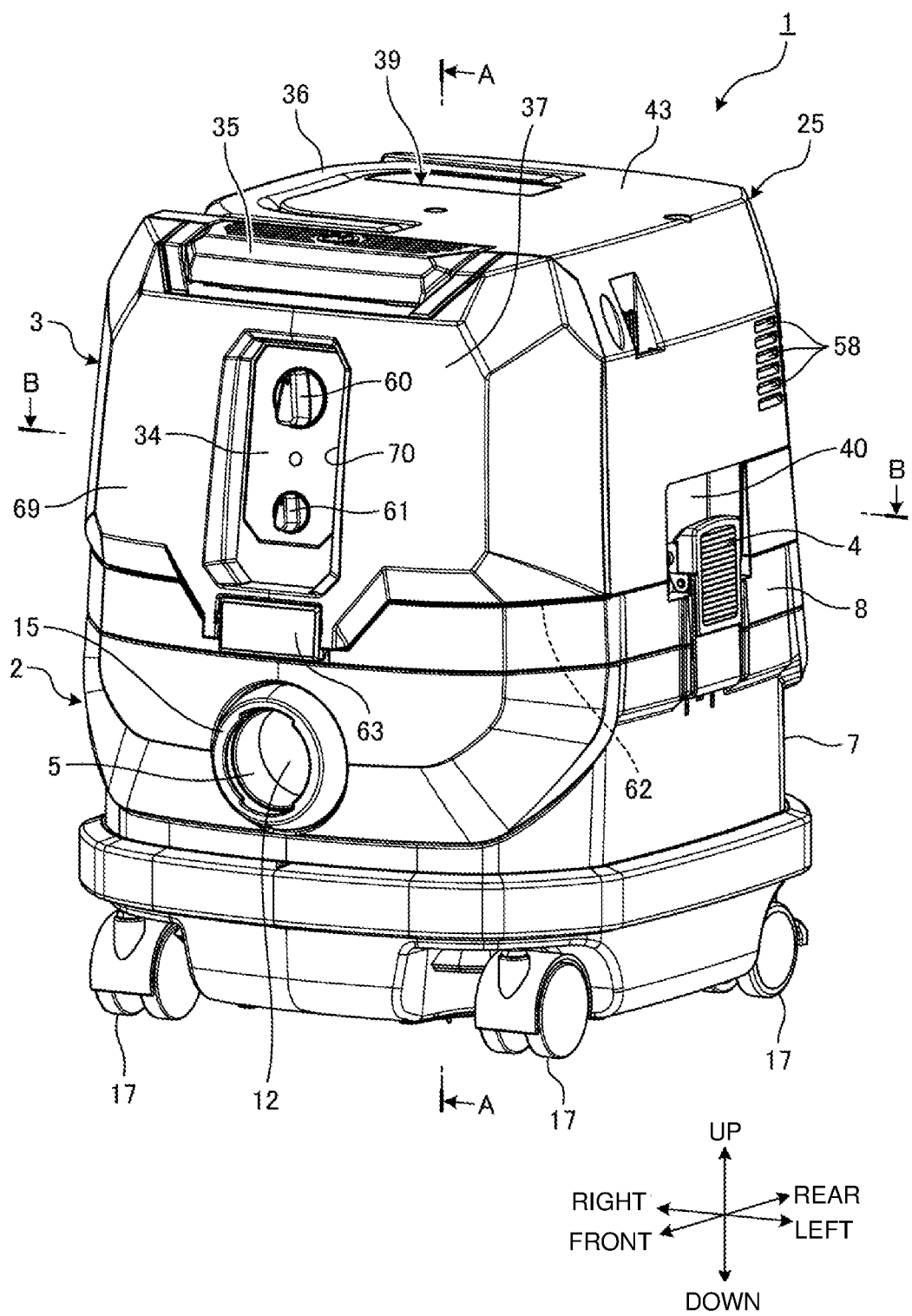
FIG. 1 is a perspective view of a dust collector according to an embodiment as viewed from the left front.
Figure 2:
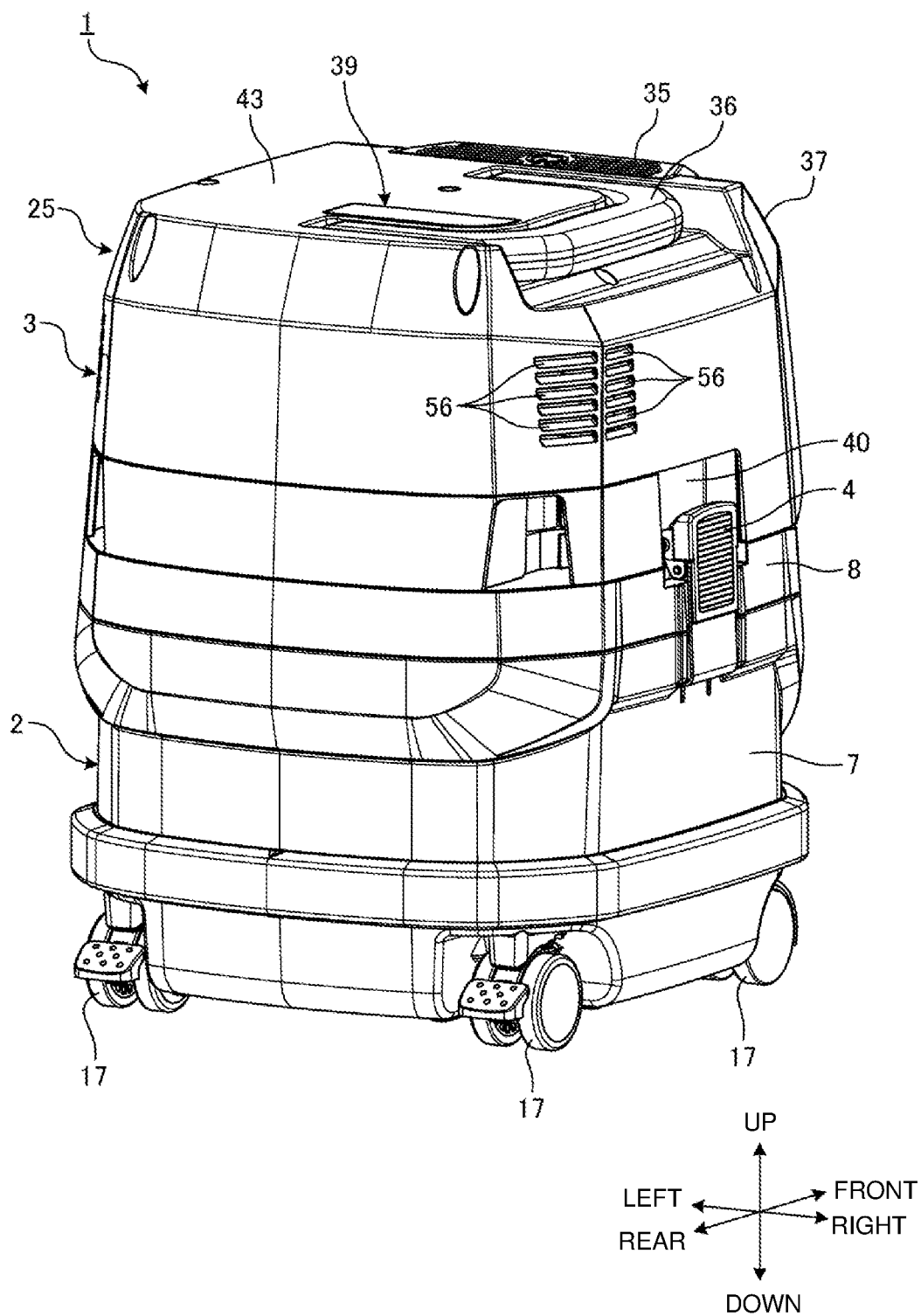
FIG. 2 is a perspective view of the dust collector according to the embodiment as viewed from the right rear.
Figure 3:
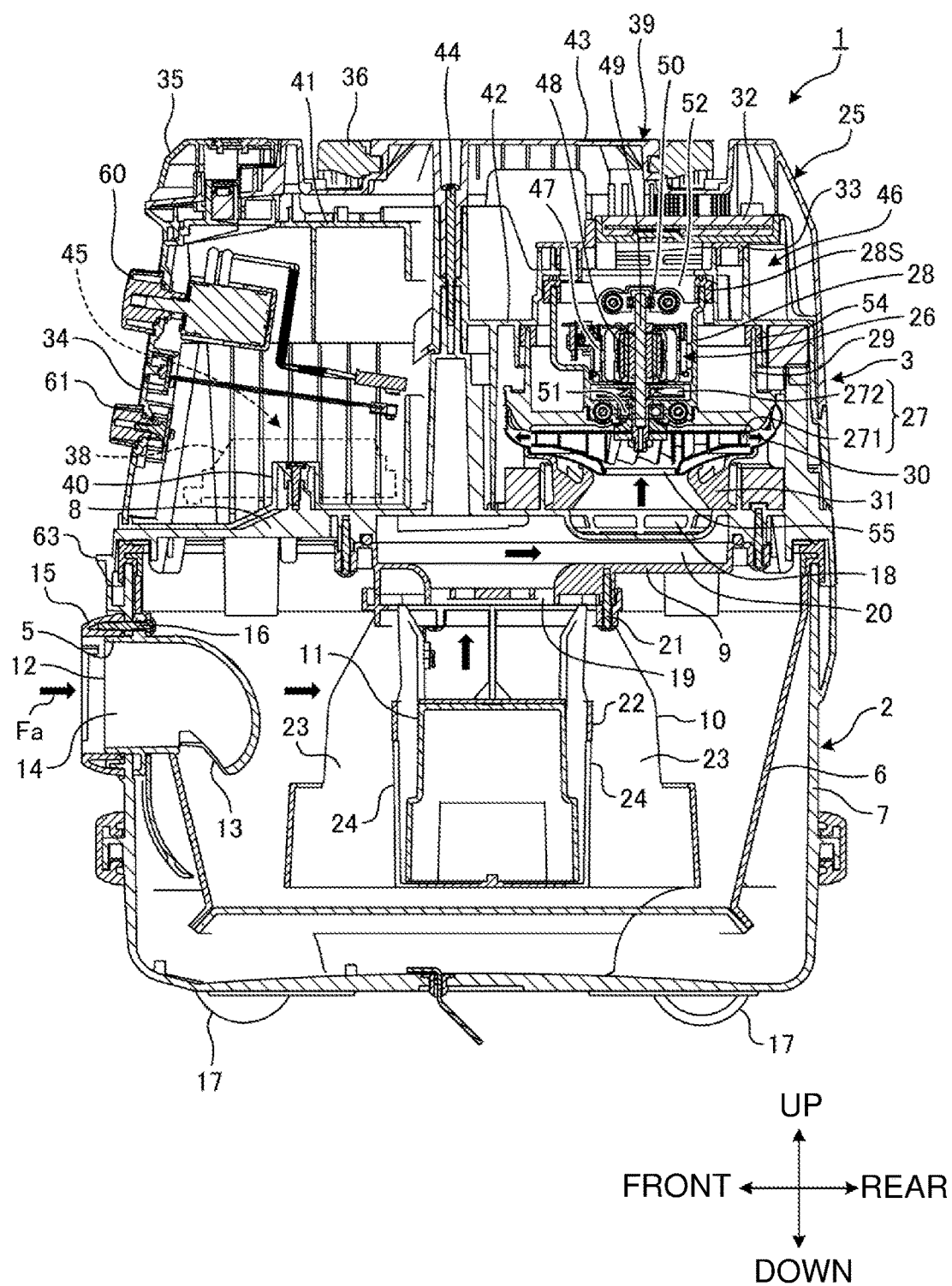
FIG. 3 is a cross-sectional view of the dust collector according to the embodiment.
Figure 4:
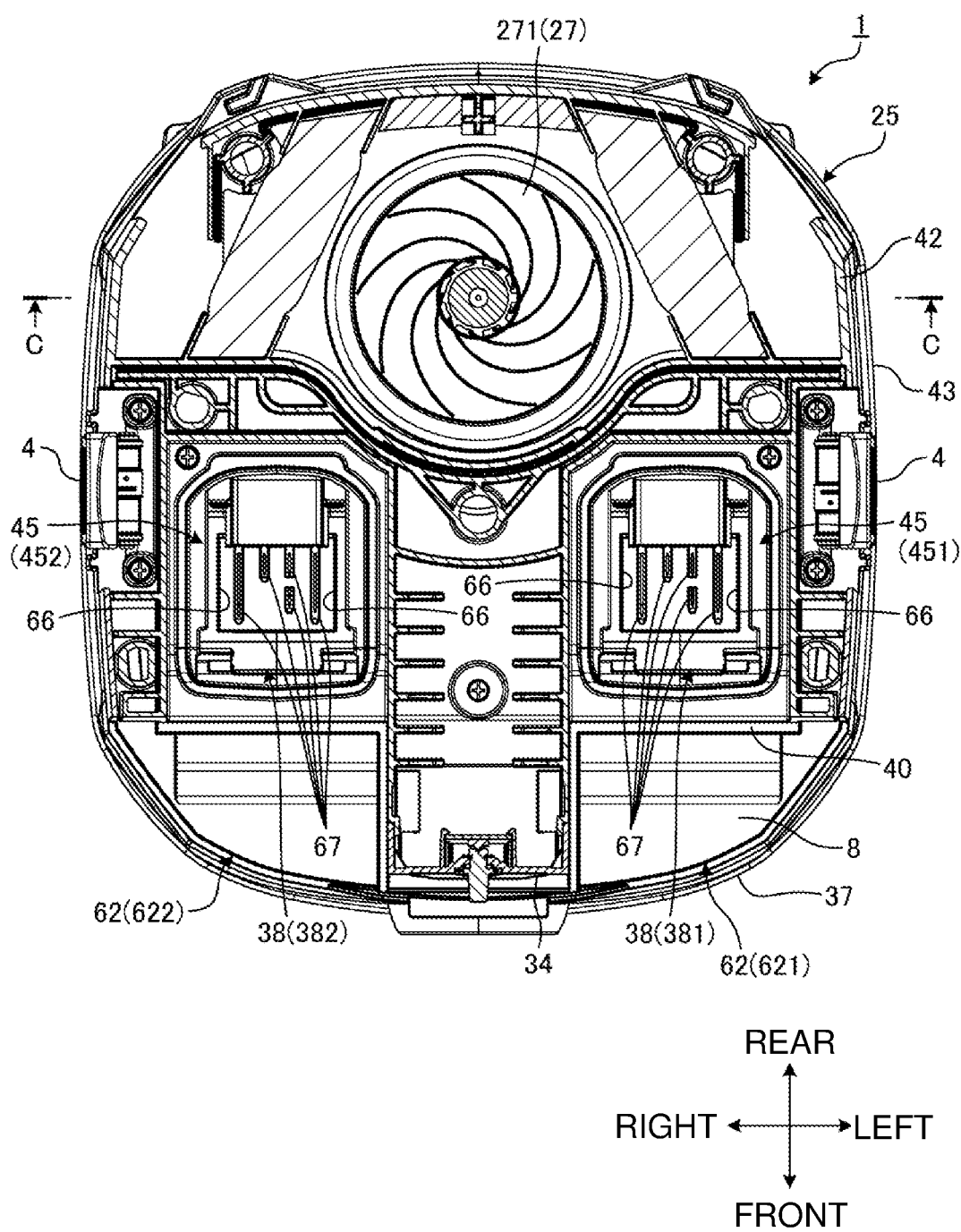
FIG. 4 is a cross-sectional view of the dust collector according to the embodiment.
Figure 5:
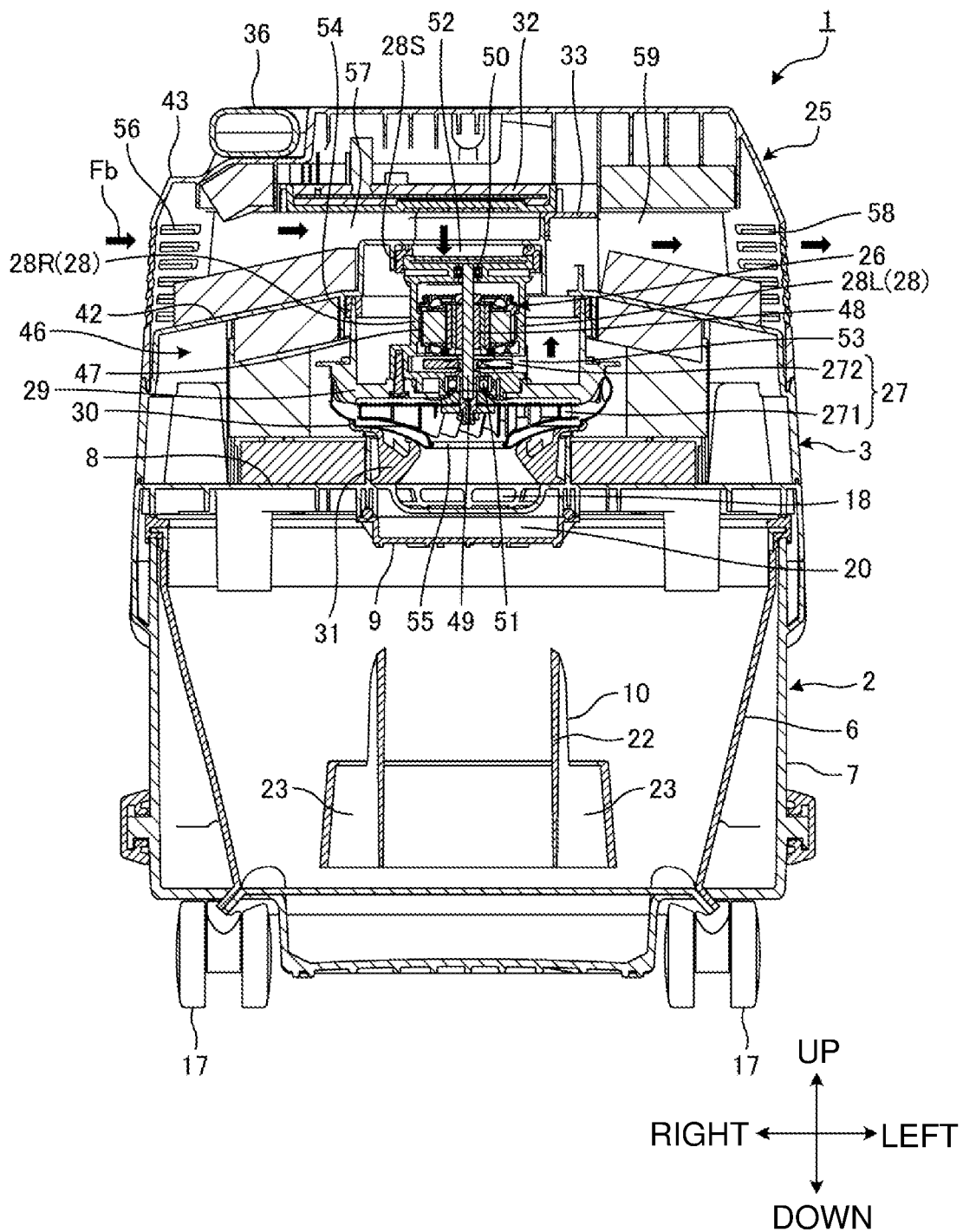
FIG. 5 is a cross-sectional view of the dust collector according to the embodiment.

FIG. 1 is a perspective view of the dust collector 1 according to an embodiment as viewed from the left front. FIG. 2 is a perspective view of the dust collector 1 according to the embodiment as viewed from the right rear. FIGS. 3 to 5 are cross-sectional views of the dust collector 1 according to the embodiment. FIG. 3 is a cross-sectional view taken along line A-A in FIG. 1 as viewed in the direction indicated by arrows. FIG. 4 is a cross-sectional view taken along line B-B in FIG. 1 as viewed in the direction indicated by arrows. FIG. 5 is a cross-sectional view taken along line C-C in FIG. 4 as viewed in the direction indicated by arrows.

The dust collector 1 according to the embodiment is a wet and dry dust collector that can suck liquid as well as gas. The gas is, for example, air. The liquid is, for example, water.

As shown in FIGS. 1 to 5, the dust collector 1 includes a tank unit 2, a body 3, and latches 4. The body 3 is located above the tank unit 2. The tank unit 2 supports the body 3. The latches 4 fasten the tank unit 2 and the body 3 together. The latches 4 are on the right and left sides of the tank unit 2.

The tank unit 2 includes a suction tube 5, a tank 6, a tank housing 7, a tank cover 8, a lower tank cover 9, a support 10, and a float 11.

The suction tube 5 sucks in at least one of gas or liquid. The suction tube 5 is at the front of the tank unit 2. The suction tube 5 includes a suction port 12, an exhaust port 13, and a flow channel 14. The flow channel 14 connects the suction port 12 and the exhaust port 13. The suction tube 5 has the suction port 12 at its front end. The suction tube 5 has the exhaust port 13 at its rear end. The suction port 12 is in the front of the tank unit 2. The suction port 12 faces frontward. The exhaust port 13 is located in an internal space of the tank 6. Dust is sucked in through the suction port 12 together with gas or liquid, or both, and then flows into the internal space of the tank 6.

The suction port 12 is connected to a dust collection hose (not shown). The tank unit 2 includes a joint 15. The joint 15 surrounds the front end of the suction tube 5. The joint 15 is fastened to the front of the suction tube 5 and to the front of the tank housing 7 with a screw 16. The dust collection hose is at least partially received in the suction tube 5 through the suction port 12. The dust collection hose is at least partially fastened to the joint 15.

The tank 6 has the internal space to store dust sucked in through the suction port 12. When liquid is sucked in through the suction port 12, the tank 6 stores the liquid. The liquid is stored in the internal space of the tank 6.

The tank housing 7 surrounds the tank 6. The tank housing 7 receives casters 17 in its lower portion. The casters 17 support the tank unit 2 in a movable manner. The tank unit 2 supporting the body 3 moves with the casters 17 on a target cleaning surface. The user of the dust collector 1 can move the dust collector 1 forward on the target cleaning surface by pulling the dust collector 1 forward using the dust collection hose.

The tank cover 8 covers an opening in an upper portion of the tank 6. The tank cover 8 has a vent 18.

The lower tank cover 9 is fastened to the lower surface of the tank cover 8 with a screw (not shown). The lower tank cover 9 has an inflow port 19 facing the internal space of the tank 6. The tank cover 8 and the lower tank cover 9 define a flow channel 20 between them. The flow channel 20 connects the inflow port 19 and the vent 18.

The support 10 is located in the internal space of the tank 6. The support 10 supports the float 11 in a manner movable in the vertical direction. The support 10 is fastened to the lower surface of the lower tank cover 9 with a screw 21. The support 10 includes a cylinder 22 and multiple plates 23. The plates 23 surround the cylinder 22. The cylinder 22 is surrounded by a filter (not shown). The cylinder 22 has openings 24. The gas or liquid around the cylinder 22 flows into an inner space of the cylinder 22 through the filter and the openings 24. The filter collects dust from the gas or the liquid flowing into the cylinder 22.

The float 11 is located in the internal space of the tank 6, or more specifically, in the inner space of the cylinder 22. The float 11 floats on liquid. When no liquid is in the inner space of the cylinder 22, the float 11 is at the bottom of the cylinder 22. When liquid is sucked into the internal space of the tank 6 through the suction port 12, the liquid flows into the inner space of the cylinder 22 through the openings 24. The float 11 then moves upward following the liquid level (water level) in the inner space of the cylinder 22. The liquid level in the inner space of the cylinder 22 refers to the height of the surface of the liquid (water surface) in the inner space of the cylinder 22. The float 11 moves upward as it is guided by the cylinder 22. The float 11 moves upward with the liquid in the inner space of the cylinder 22 to close the inflow port 19 in the lower tank cover 9.

The body 3 includes a body housing 25, a motor 26, a fan 27, a motor housing 28, a fan base 29, a fan cover 30, a support ring 31, a controller 32, a thermal insulator 33, a switch base 34, a switch button 35, a handle 36, a battery cover 37, battery mounts 38, and an adapter mount 39.

The body housing 25 is supported on the tank unit 2. The body housing 25 includes a lower housing 40, an upper housing 41, a separator housing 42, and a cowling 43.

The lower housing 40 and the upper housing 41 are located in a front portion of the body 3. The separator housing 42 is located in a rear portion of the body 3.

The lower housing 40 is connected to the tank cover 8. The upper housing 41 is located above the lower housing 40. The upper housing 41 is fastened to the tank cover 8 with a screw 44. The lower housing 40 is held between the upper housing 41 and the tank cover 8.

The lower housing 40, the upper housing 41, and the tank cover 8 define battery compartments 45.

The separator housing 42 is connected to the tank cover 8. The separator housing 42 is fastened to the tank cover 8 with a screw (not shown).

The separator housing 42 contains a drive unit compartment 46. The separator housing 42 at least partially separates the battery compartments 45 and the drive unit compartment 46.

The cowling 43 covers the lower housing 40, the upper housing 41, and the separator housing 42.

The motor 26 is accommodated in the body housing 25. The motor 26 in the embodiment is accommodated in the drive unit compartment 46 in the separator housing 42. The motor 26 is a brushless inner-rotor motor. The motor 26 generates power for rotating the fan 27. The motor 26 includes a stator 47, a rotor 48, and a rotor shaft 49. The rotor 48 is located inside the stator 47. The rotor shaft 49 is fixed to the rotor 48. The rotor shaft 49 extends vertically. The rotor shaft 49 is rotatably supported by bearings 50 and 51. The bearings 50 and 51 are ball bearings. The bearing 50 rotatably supports an upper portion of the rotor shaft 49. The bearing 51 rotatably supports a lower portion of the rotor shaft 49. The rotor shaft 49 has its rotation axis extending vertically.

The fan 27 is fixed to the rotor shaft 49. The fan 27 rotates in response to the motor 26. The fan 27 rotates as the rotor shaft 49 rotates. The fan 27 includes a blowing fan 271 and a cooling fan 272. The blowing fan 271 generates a suction force at the suction port 12. The cooling fan 272 generates an airflow to cool the motor 26. The blowing fan 271 is fixed to the lower end of the rotor shaft 49. The cooling fan 272 is fixed to a portion of the rotor shaft 49 between the lower end of the stator 47 and the blowing fan 271. The blowing fan 271 and the cooling fan 272 are centrifugal fans. The blowing fan 271 has a larger outer diameter than the cooling fan 272. The blowing fan 271 and the cooling fan 272 rotate as the rotor shaft 49 rotates.

The motor housing 28 accommodates the motor 26 and the cooling fan 272 in the body housing 25. The motor housing 28 supports the motor 26. The motor housing 28 supports the bearings 50 and 51. The motor housing 28 is cylindrical and dividable into halves. As shown in FIG. 5, the motor housing 28 includes a left motor housing 28L and a right motor housing 28R. The right motor housing 28R is joined to the left motor housing 28L. The motor housing 28 has its upper end receiving an annular seal 28S. The seal 28S is formed from synthetic rubber, such as nitrile rubber (NBR) or silicone rubber. The upper end of the motor housing 28 is joined to the separator housing 42 with the seal 28S in between. The seal 28S seals the boundary between the upper end of the motor housing 28 and the inner surface of the separator housing 42.

The motor housing 28 is located inside the separator housing 42. More specifically, the motor housing 28 is located in the drive unit compartment 46. The motor housing 28 accommodates the motor 26 and the cooling fan 272 in the separator housing 42. The motor 26 and the cooling fan 272 are located in an internal space of the motor housing 28. The motor housing 28 has a motor inlet 52 in its upper end and a motor outlet 53 in a lower portion of its side surface. The gas around the motor housing 28 flows into the internal space of the motor housing 28 through the motor inlet 52. The gas inside the internal space of the motor housing 28 flows out of the motor housing 28 through the motor outlet 53.

The fan base 29 surrounds and supports the motor housing 28. The fan base 29 is formed from a synthetic resin, such as a polycarbonate resin. The fan base 29 has its upper end receiving an annular seal 54. The seal 54 is formed from synthetic rubber, such as NBR or silicone rubber. The upper end of the fan base 29 is joined to the separator housing 42 with the seal 54 in between. The seal 54 seals the boundary between the upper end of the fan base 29 and the inner surface of the separator housing 42.

The fan cover 30 covers at least a part of the blowing fan 271. The fan cover 30 is supported on the fan base 29. The fan cover 30 at least partially surrounds the blowing fan 271. The fan cover 30 is at least partially located below the blowing fan 271. The fan cover 30 has a fan inlet 55 in its lower portion. The fan inlet 55 is located above the vent 18 in the tank cover 8. The fan inlet 55 faces the vent 18. The fan cover 30 has a vent in a portion adjacent to the blowing fan 271.

The support ring 31 supports the lower surface of the fan cover 30. The support ring 31 is annular and is formed from synthetic rubber, such as NBR or silicone rubber. The support ring 31 is supported on the tank cover 8. The support ring 31 is in tight contact with the lower surface of the fan cover 30 and with the upper surface of the tank cover 8. The support ring 31 seals the boundary between the fan cover 30 and the tank cover 8.

The blowing fan 271 rotates to generate a suction force at the suction port 12. As shown by arrow Fa in FIG. 3, the gas sucked into the internal space of the tank 6 through the suction port 12 flows into the inner space of the cylinder 22 in the support 10 through the openings 24 and then into the inflow port 19 in the lower tank cover 9. The gas then flows through the flow channel 20 between the lower tank cover 9 and the tank cover 8 and through the vent 18 and the support ring 31. The gas then flows into the blowing fan 271 through the fan inlet 55 and flows out of the fan cover 30 through the vent in the fan cover 30.

As the cooling fan 272 rotates, the gas around the motor housing 28 flows into the internal space of the motor housing 28 through the motor inlet 52 to cool the motor 26. The gas then flows out of the motor housing 28 through the motor outlet 53.

The body housing 25 in the embodiment has cooling inlets 56, an intake channel 57, cooling outlets 58, and an exhaust channel 59. The cooling inlets 56 are located in a right rear portion of the body housing 25. The cooling inlets 56 connect the outside and the inside of the body housing 25. The cooling outlets 58 are located in a left rear portion of the body housing 25. The cooling outlets 58 connect the inside and the outside of the body housing 25. The intake channel 57 is defined in an internal space of the body housing 25. The intake channel 57 connects the cooling inlets 56 to the motor inlet 52. The exhaust channel 59 is defined in the internal space of the body housing 25. The exhaust channel 59 connects the motor outlet 53 to the cooling outlets 58.

As shown by arrow Fb in FIG. 5, in response to rotation of the cooling fan 272, the gas for cooling the motor 26 flows into the intake channel 57 through the cooling inlets 56. The gas flowing through the intake channel 57 then flows into the internal space of the motor housing 28 through the motor inlet 52 to cool the motor 26. The gas then flows into the exhaust channel 59 through the motor outlet 53. The gas flowing through the exhaust channel 59 then flows out of the body housing 25 through the cooling outlets 58.

When liquid is sucked in through the suction port 12, the liquid is stored in the internal space of the tank 6. When the water level in the inner space of the cylinder 22 in the support 10 rises, the float 11 moves upward. The float 11, which has moved upward, closes the inflow port 19 in the lower tank cover 9. This closes the flow channel 20 communicating with the fan inlet 55 in the fan cover 30. In other words, the float 11 moves upward with the liquid in the inner space of the cylinder 22 to close the flow channel 20 that communicates with the fan inlet 55. The inflow port 19 in the lower tank cover 9 is closed by the float 11 and the flow channel 20 is thus closed, reducing entry of the liquid into the drive unit compartment 46.

Although the fan inlet 55 is closed, the rotating cooling fan 272 can cool the motor 26.

The controller 32 includes a computer system. The controller 32 outputs control signals for controlling an electronic device incorporated in the dust collector 1. The electronic device includes the motor 26. The controller 32 outputs control signals for controlling the motor 26. The controller 32 includes a control board on which multiple electronic components are mounted. Examples of the electronic components mounted on the control board include a processor such as a central processing unit (CPU), a nonvolatile memory such as a read-only memory (ROM) or a storage device, a volatile memory such as a random-access memory (RAM), a transistor, a capacitor, and a resistor.

The thermal insulator 33 is located between the motor 26 and the controller 32. The thermal insulator 33 in the embodiment supports the controller 32. The thermal insulator 33 is located at the top of the separator housing 42.

The switch base 34 is located at the front of the body housing 25. The switch base 34 is a plate elongated in the vertical direction. The switch base 34 includes a main power switch 60 and a suction force adjustment switch 61. The main power switch 60 and the suction force adjustment switch 61 are located on the switch base 34. The main power switch 60 and the suction force adjustment switch 61 are arranged in the vertical direction. The suction force adjustment switch 61 in the embodiment is located below the main power switch 60. The suction force adjustment switch 61 may be located above the main power switch 60.

The switch button 35 is located at the front of the body housing 25 and above the switch base 34. The switch button 35 is supported by the body housing 25 in a pivotable manner.

The handle 36 is supported in an upper portion of the body housing 25 in a pivotable manner. The handle 36 is located behind the switch button 35. The user of the dust collector 1 carries the dust collector 1 by holding the handle 36.

The body housing 25 has body openings 62 communicating with the battery compartments 45. The body openings 62 are located in the body housing 25. The body openings 62 in the embodiment are located in the front of the body housing 25.

The battery cover 37 is operable to cover and uncover the body openings 62. The battery cover 37 has its upper end pivotably supported on an upper front portion of the body housing 25.

Figure 6:
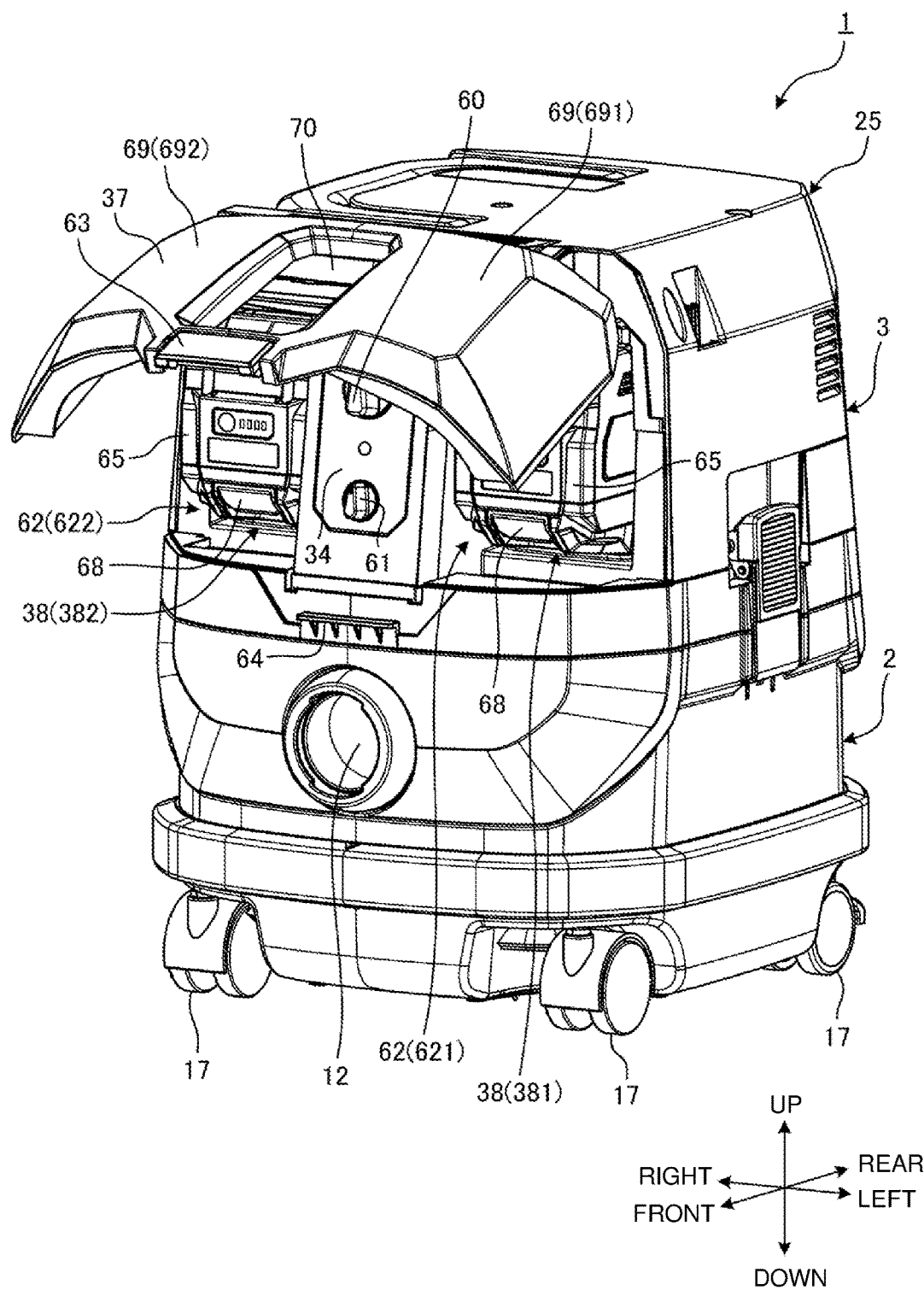
FIG. 6 is a perspective view of the dust collector according to the embodiment with body openings uncovered as viewed from the left front.
Figure 7:
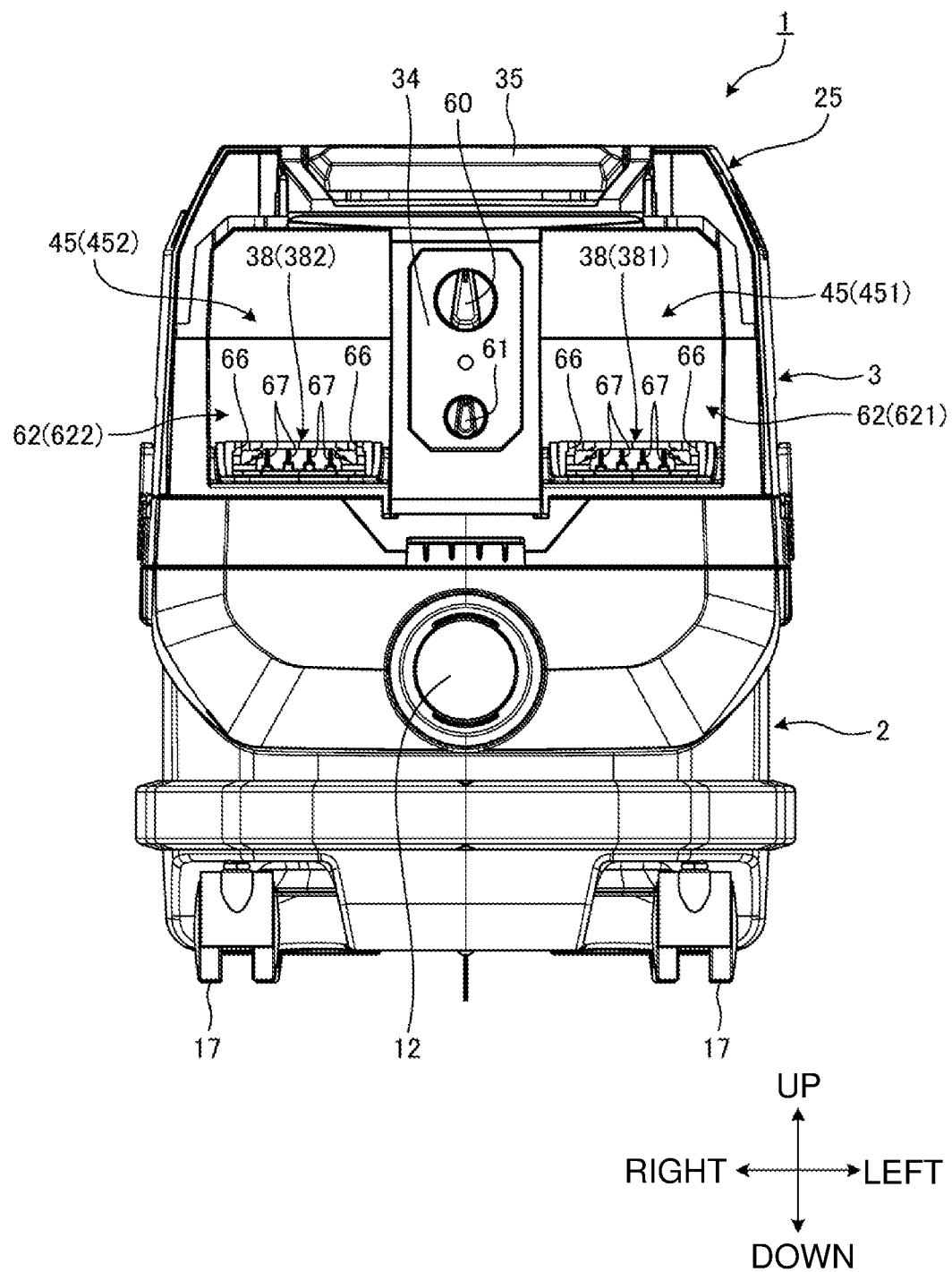
FIG. 7 is a front view of the dust collector according to the embodiment without a battery cover.

FIG. 6 is a perspective view of the dust collector 1 according to the embodiment with the body openings 62 uncovered as viewed from the left front. FIG. 7 is a front view of the dust collector 1 according to the embodiment without the battery cover 37.

Each body opening 62 communicates with the corresponding battery compartment 45. The body openings 62 are located in the front of the body housing 25. The battery cover 37 is operable to cover and uncover the body openings 62. In the embodiment, the battery cover 37 has its upper end pivotably supported on the upper front portion of the body housing 25. The upper end of the battery cover 37 is hinged to the upper front portion of the body housing 25. The battery cover 37 has a hinge axis extending laterally. The battery cover 37 is supported on the body housing 25 to have its lower end rotatable in the vertical direction.

A lock lever 63 is located at the lower end of the battery cover 37. A hook 64 is located on the front surface of the body housing 25. The hook 64 is located below the switch base 34 and the body openings 62. The lock lever 63 is engaged with the hook 64 to fasten the battery cover 37 to the body housing 25.

The battery mounts 38 are located frontward from the motor 26 in the body housing 25. Each battery mount 38 is located in the corresponding battery compartment 45. Each body opening 62 communicates with the corresponding battery mount 38. A battery pack 65 is attachable to and detachable from the battery mount 38.

The battery pack 65 serves as a power supply for the dust collector 1. When mounted on the battery mount 38, the battery pack 65 powers the electronic device incorporated in the dust collector 1. The motor 26 runs on power supplied from the battery pack 65. The controller 32 operates on power supplied from the battery pack 65. The battery pack 65 is a general-purpose battery usable as a power supply for various electrical instruments. The battery pack 65 is usable for powering power tools. The battery pack 65 is usable for powering electrical instruments other than power tools. The battery pack 65 is usable for powering dust collectors other than the dust collector 1 according to the embodiment. The battery pack 65 includes a lithium-ion battery. The battery pack 65 includes a rechargeable battery. The battery mount 38 has the same structure as a battery mount included in a power tool.

The switch base 34 is adjacent to the body openings 62. The battery mounts 38 in the embodiment include a first battery mount 381 and a second battery mount 382. The first battery mount 381 is located leftward from the switch base 34. The second battery mount 382 is located rightward from the switch base 34. The battery compartments 45 include a first battery compartment 451 and a second battery compartment 452. The first battery compartment 451 receives the first battery mount 381. The second battery compartment 452 receives the second battery mount 382. The body openings 62 include a first body opening 621 and a second body opening 622. The first body opening 621 communicates with the first battery mount 381. The second body opening 622 communicates with the second battery mount 382.

The battery cover 37 includes a cover 69 and a cover opening 70. The cover 69 covers the body openings 62. The cover opening 70 receives the switch base 34. The cover 69 includes a first cover portion 691 and a second cover portion 692. The first cover portion 691 covers the first body opening 621. The second cover portion 692 covers the second body opening 622. When the cover 69 covers the body openings 62, the switch base 34 has its surface received in the cover opening 70. The switch base 34 is exposed through the cover opening 70.

Battery Mount

Figure 8:
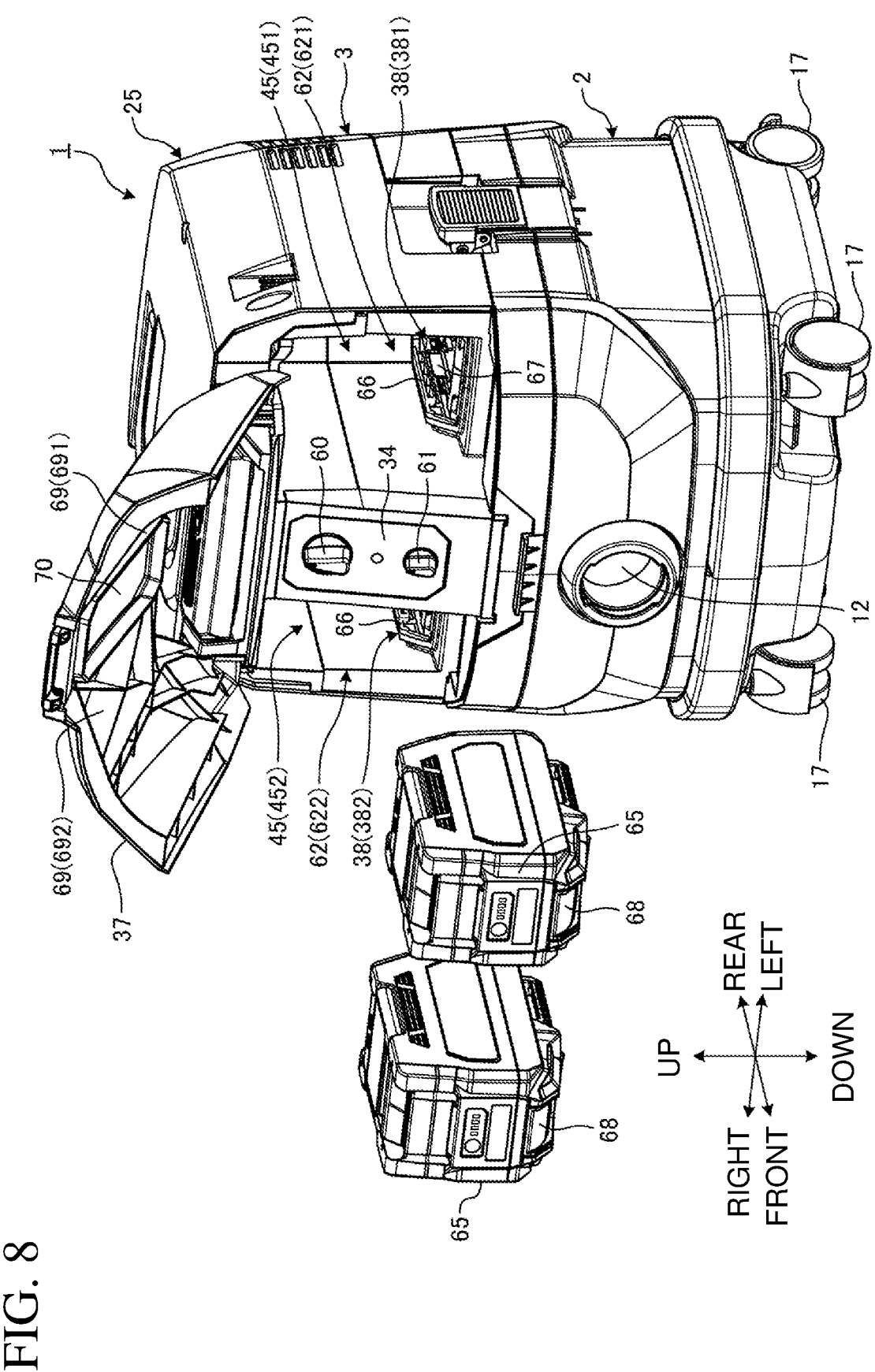
FIG. 8 is a perspective view of battery packs in the embodiment being attached to battery mounts as viewed from the left front.

FIG. 8 is a perspective view of the battery packs 65 in the embodiment being attached to the battery mounts 38 as viewed from the left front.

The user of the dust collector 1 attaches and detaches the battery packs 65 to and from the battery mounts 38. Each battery mount 38 includes guides 66 and body terminals 67. Each battery pack 65 includes battery terminals. The guides 66 on the battery mount 38 guide the battery pack 65 placed through the body opening 62 in a horizontal direction.

In the embodiment, the horizontal direction refers to a direction parallel to a plane including a front-rear axis parallel to the front-rear direction and a lateral axis parallel to the lateral direction.

In an embodiment, the guides 66 guide the battery pack 65 in the front-rear direction.

The body terminals 67 on the battery mount 38 are connectable to the battery terminals on the battery pack 65. The user places the battery pack 65 onto the battery mount 38 from the front of the battery mount 38 and moves the battery pack 65 backward. The battery pack 65 is thus attached to the battery mount 38. The battery pack 65 moves backward as it is guided by the guides 66 on the battery mount 38. This allows the battery pack 65 to be attached to the battery mount 38. The battery terminals on the battery pack 65 are thus electrically connected to the body terminals 67 on the battery mount 38. The battery pack 65 includes a release button 68. The user of the dust collector 1 operates the release button 68 and moves the battery pack 65 forward to remove the battery pack 65 from the battery mount 38.

The first battery mount 381 and the second battery mount 382 are electrically connected in parallel. When a battery pack 65 is attached to the first battery mount 381 without another battery pack 65 attached to the second battery mount 382, the electronic device incorporated in the dust collector 1 is operable on power supplied from the battery pack 65 attached to the first battery mount 381. When a battery pack 65 is attached to the second battery mount 382 without another battery pack 65 attached to the first battery mount 381, the electronic device incorporated in the dust collector 1 is operable on power from the battery pack 65 attached to the second battery mount 382.

The main power switch 60 switches between supplying power and stopping supplying power from the battery pack 65 to the dust collector 1. The suction force adjustment switch 61 adjusts the rotational speed per unit time of the motor 26. This adjusts the suction force at the suction port 12.

The switch button 35 is operable to switch the motor 26 between a driving state and a stopping state while the battery pack 65 is supplying power to the dust collector 1.

As shown in FIG. 3, the battery mounts 38 and the motor 26 are arranged in the front-rear direction. The battery mounts 38 in the embodiment are located frontward from the motor 26. The tank unit 2 has the suction port 12 in the front. The body 3 includes the switch base 34 at the front. The distance between the battery mounts 38 and the suction port 12 is shorter than the distance between the motor 26 and the suction port 12 in the front-rear direction. The distance between the battery mounts 38 and the switch base 34 is shorter than the distance between the motor 26 and the switch base 34 in the front-rear direction.

Each battery mount 38 has its center located frontward from the center of the body housing 25 in the front-rear direction. When attached to the battery mount 38, the battery pack 65 has its center of gravity located frontward from the center of the body housing 25.

The motor 26 and the battery mounts 38 do not overlap each other in the horizontal direction. The battery mounts 38 are located below the motor 26 in the vertical direction. The battery mounts 38 are at least partially located at the same level as the fan 27 in the vertical direction. The battery mounts 38 may be at least partially located at the same level as the motor 26 in the vertical direction. More specifically, the battery mounts 38 may be at least partially at the same height as the motor 26.

Figure 9:
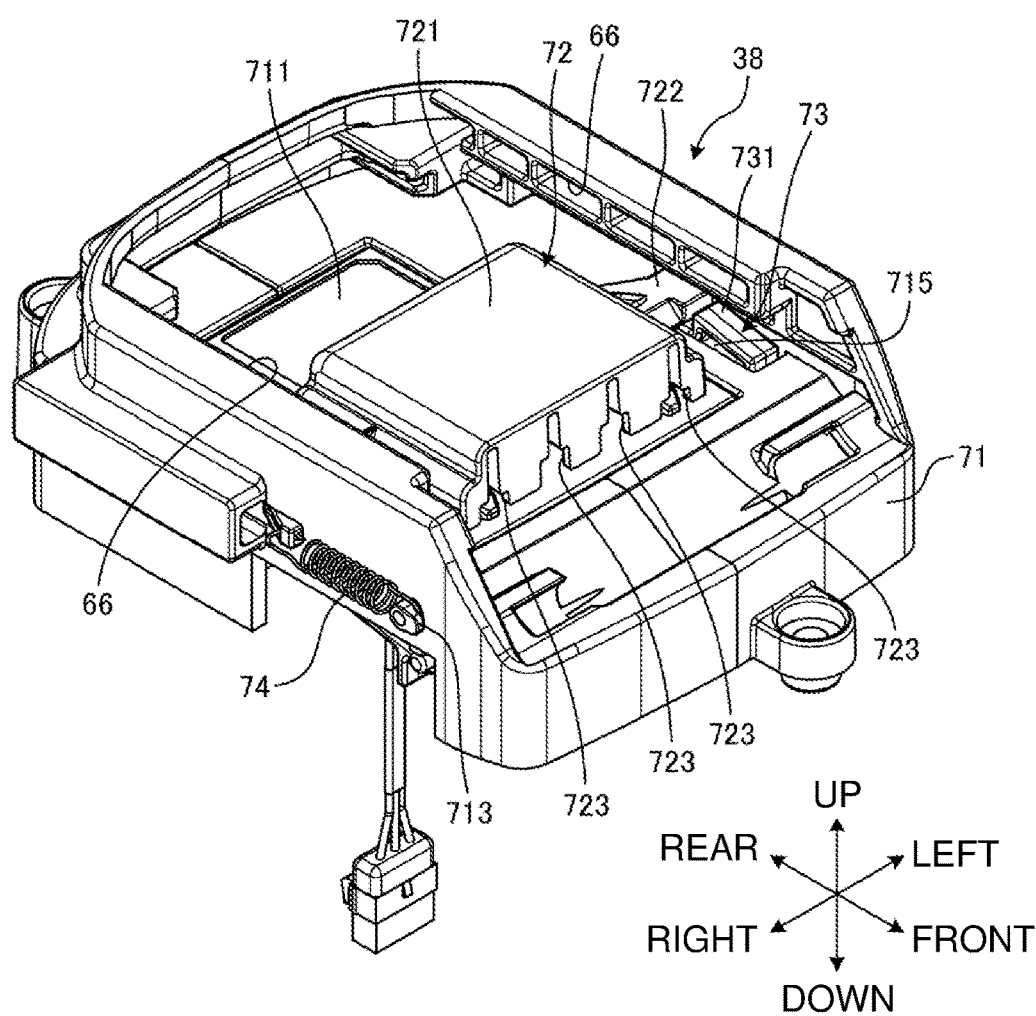
FIG. 9 is a perspective view of a battery mount in the embodiment as viewed from the right front.
Figure 10:
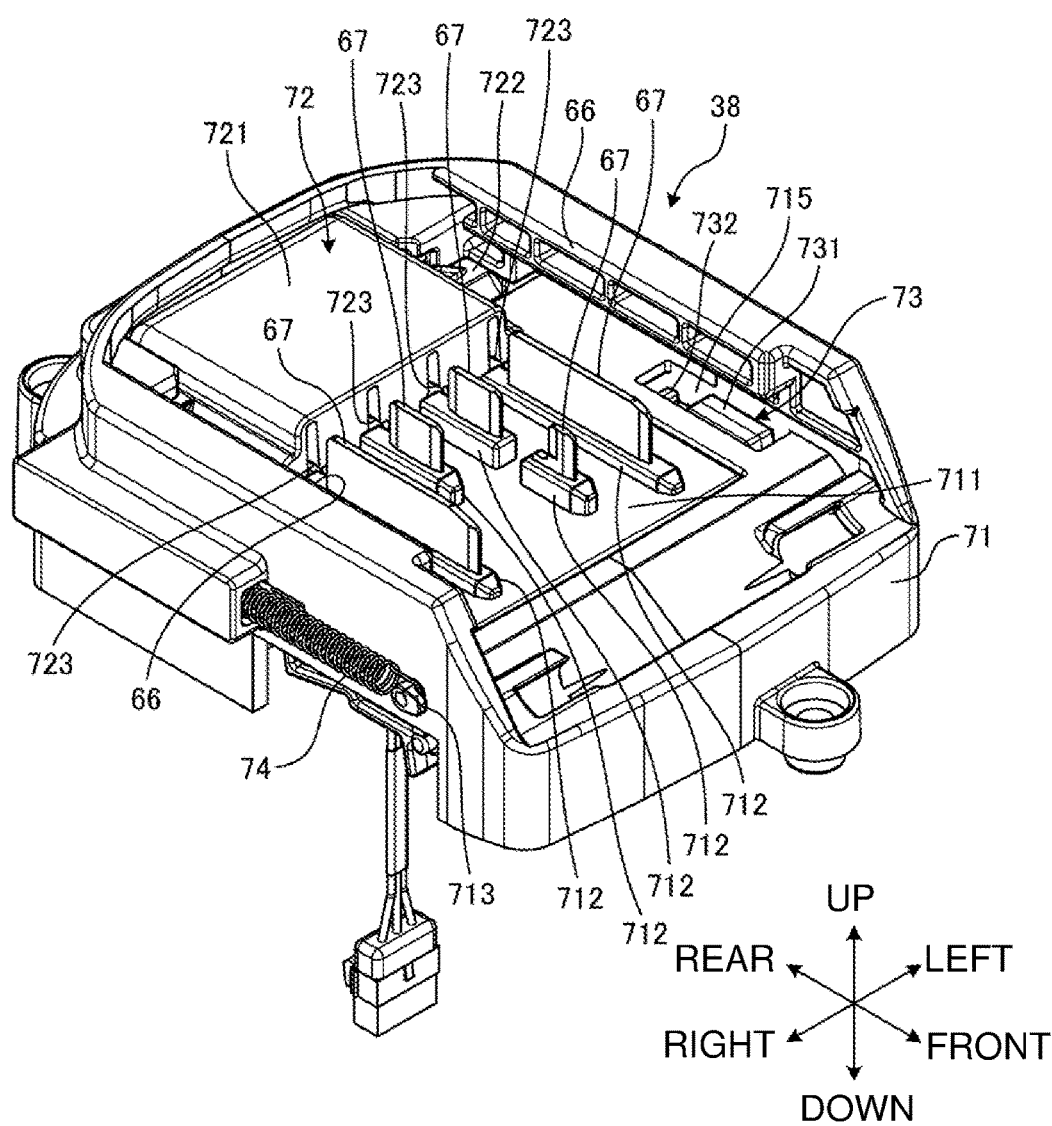
FIG. 10 is a perspective view of the battery mount in the embodiment as viewed from the right front.
Figure 11:
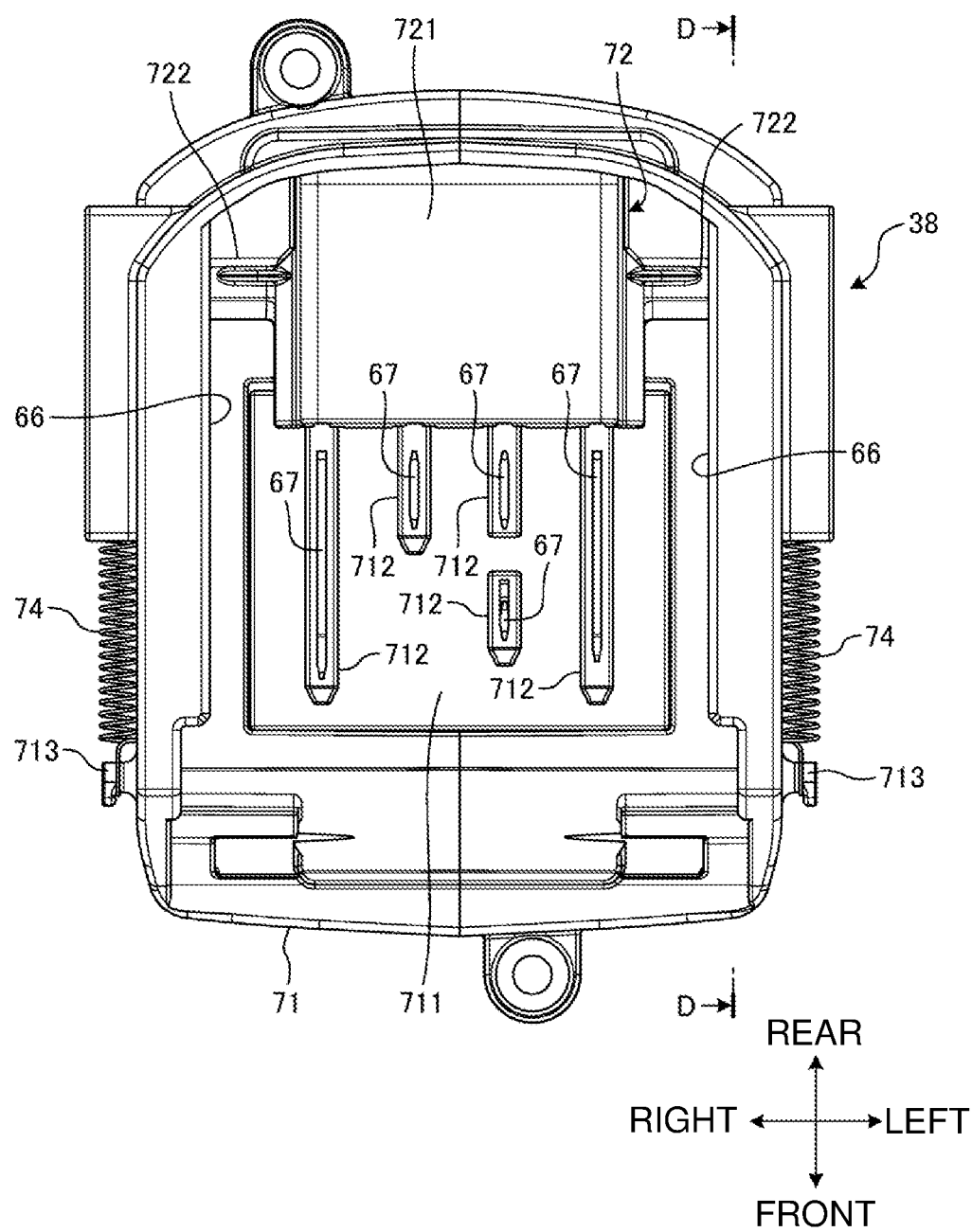
FIG. 11 is a plan view of the battery mount in the embodiment.

FIGS. 9 and 10 are perspective views of the battery mount 38 in the embodiment as viewed from the right front. FIG. 9 shows the battery mount 38 without the battery pack 65 attached. FIG. 10 shows the battery mount 38 with the battery pack 65 attached. However, FIG. 10 does not show the battery pack 65. FIG. 11 is a plan view of the battery mount 38 in the embodiment. FIG. 11 shows the battery mount 38 with the battery pack 65 attached. However, FIG. 11 does not show the battery pack 65.

The battery mount 38 includes a base 71, the guides 66, the body terminals 67, a terminal cover 72, lock plates 73, and first coil springs 74.

The base 71 has a support surface 711 to face the battery pack 65. The support surface 711 faces upward. The guides 66 are located on the right and left of the support surface 711. The guides 66 guide the battery pack 65 in the front-rear direction. The body terminals 67 protrude upward from the support surface 711.

The terminal cover 72 includes a cover 721 and a pair of locks 722. The cover 721 faces the support surface 711. The pair of locks 722 protrude from the cover 721. One of the locks 722 protrudes leftward from the left surface of the cover 721. The other of the locks 722 protrudes rightward from the right surface of the cover 721. As shown in FIG. 9, the cover 721 covers the body terminals 67 without the battery pack 65 attached to the battery mount 38. This prevents the user of the dust collector 1 from contacting the body terminals 67.

The terminal cover 72 is movable in the front-rear direction. In the embodiment, the support surface 711 includes guides 712. The guides 712 guide the cover 721 in the front-rear direction. The guides 712 each have a protrusion protruding upward from the support surface 711. The guides 712 extend in the front-rear direction. The cover 721 includes slides 723 guided by the guides 712. The slides 723 each have a recess on the lower surface of the cover 721. The slides 723 extend in the front-rear direction.

To attach the battery pack 65 to the battery mount 38, the user places the battery pack 65 onto the battery mount 38 from the front of the battery mount 38. As moving backward, the battery pack 65 pushes the terminal cover 72 backward. This moves the terminal cover 72 backward, exposing the body terminals 67. The battery terminals on the battery pack 65 are then connected to the body terminals 67 on the battery mount 38. The battery pack 65 is thus attached to the battery mount 38.

The lock plates 73 restrict the terminal cover 72 from moving backward.

The first coil springs 74 generate an elastic force for moving the terminal cover 72 forward. The first coil springs 74 are located on the right and left of the base 71. Hooks 713 are located on side surfaces of the base 71. The first coil springs 74 have their front ends engaged with the hooks 713.

Figure 12:
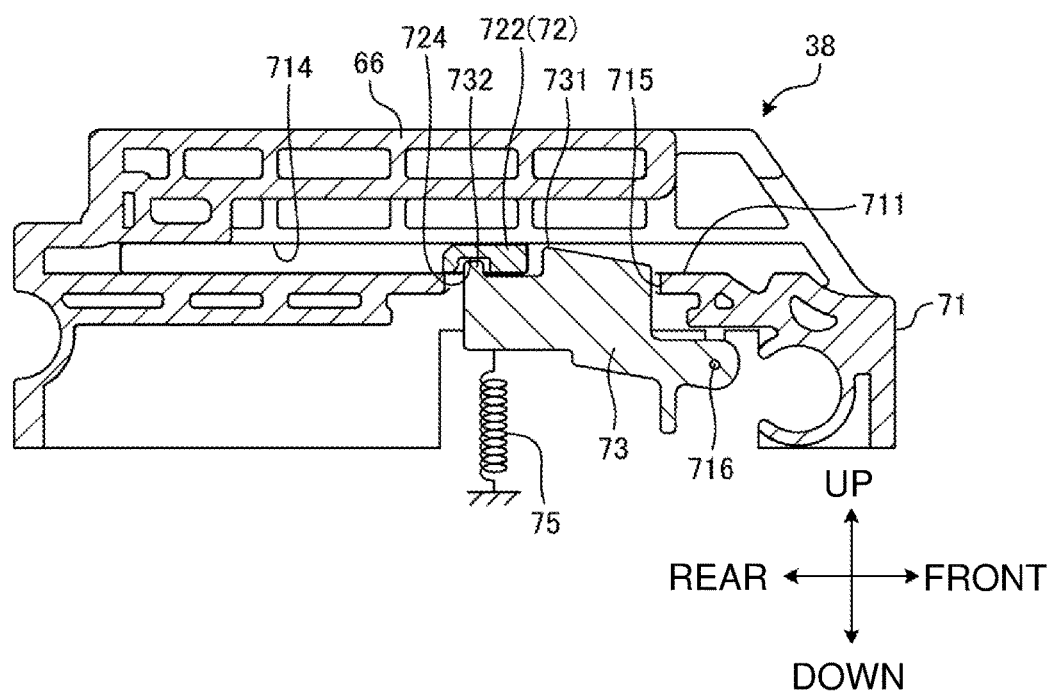
FIG. 12 is a cross-sectional view of the battery mount in the embodiment.
Figure 13:
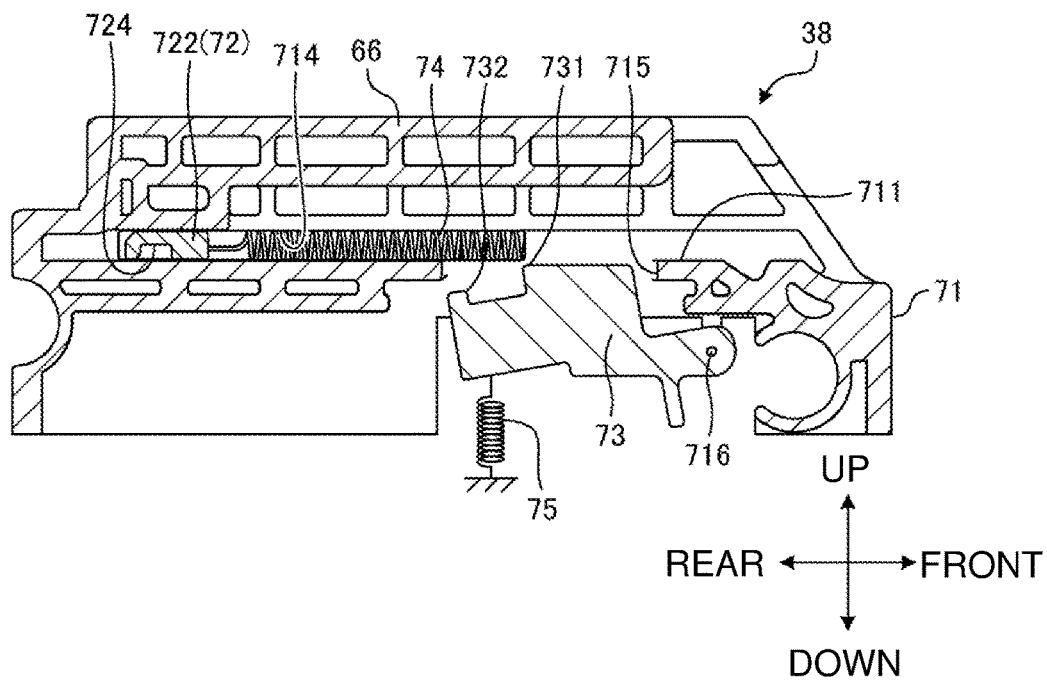
FIG. 13 is a cross-sectional view of the battery mount in the embodiment.

FIGS. 12 and 13 are cross-sectional views of the battery mount 38 in the embodiment. FIGS. 12 and 13 are cross-sectional views taken along line D-D in FIG. 11 as viewed in the direction indicated by arrows. FIG. 12 shows the battery mount 38 without the battery pack 65 attached. FIG. 13 shows the battery mount 38 with the battery pack 65 attached. However, FIG. 13 does not show the battery pack 65.

As shown in FIGS. 12 and 13, the base 71 has guide holes 714 below the guides 66. The guide holes 714 are elongated in the front-rear direction. Each lock 722 is at least partially received in the corresponding guide hole 714. The lock 722 is movable in the front-rear direction along the guide hole 714. Each first coil spring 74 has its rear end connected to the corresponding lock 722. The first coil springs 74 generate an elastic force for moving the terminal cover 72 forward.

The lock plates 73 are located on the right and left of the support surface 711. The lock plates 73 are located at positions less accessible by the user. The lock plates 73 are located below the guides 66.

The lock plates 73 are at least partially located below the support surface 711. Each lock plate 73 is at least partially received in the corresponding opening 715 in the support surface 711. The lock plate 73 includes a protrusion 731 and a hook 732.

The protrusion 731 is located above the support surface 711 through the opening 715 with the battery mount 38 without the battery pack 65 attached. The protrusion 731 is located below the support surface 711 with the battery mount 38 receiving the battery pack 65.

The hook 732 is located rearward from the protrusion 731. The hook 732 is located above the support surface 711 through the opening 715 with the battery mount 38 without the battery pack 65 attached. The hook 732 is engaged with the lock 722. The hook 732 is located below the support surface 711 with the battery mount 38 receiving the battery pack 65.

The lock 722 has a recess 724 on its lower surface. The hook 732 is placed into the recess 724 from below. The hook 732 is thus engaged with the lock 722.

The lock plate 73 has its front portion supported by the base 71 in a manner pivotable about a pivot 716. The pivot 716 has a pivot axis extending laterally.

A second coil spring 75 is connected to the rear of the lower surface of the corresponding lock plate 73. The second coil spring 75 generates an elastic force for moving the rear of the lock plate 73 upward.

As shown in FIG. 12, the lock plate 73 is pivoted to have the protrusion 731 and the hook 732 above the support surface 711 under the elastic force from the second coil spring 75 with the battery mount 38 without the battery pack 65 attached. The hook 732 located above the support surface 711 is placed into the recess 724. The lock plate 73 is thus engaged with the lock 722. The lock plates 73 restrict the terminal cover 72 from moving backward.

When placed onto the battery mount 38 from the front, the battery pack 65 pushes the protrusions 731 and pivots the lock plate 73 to cause the protrusions 731 and the hooks 732 to move downward as shown in FIG. 13. When the hooks 732 move downward and are disengaged from the recesses 724, the lock plate 73 releases the terminal cover 72 to be movable. As the protrusions 731 and the hooks 732 move downward below the support surface 711, the battery pack 65 is smoothly placed onto the battery mount 38. As moving backward, the battery pack 65 pushes the terminal cover 72 backward with the terminal cover 72 released to be movable. This moves the terminal cover 72 backward, exposing the body terminals 67. The battery terminals on the battery pack 65 are then connected to the body terminals 67 on the battery mount 38. The battery pack 65 is thus attached to the battery mount 38.

To detach the battery pack 65 from the battery mount 38, the user of the dust collector 1 operates the release button 68 on the battery pack 65 and moves the battery pack 65 forward. The terminal cover 72 then moves forward under an elastic force from the first coil springs 74. The cover 721 thus covers the body terminals 67. The lock plates 73 also pivot and cause the protrusions 731 and the hooks 732 to move upward under an elastic force from the second coil springs 75. When the hooks 732 move upward and are placed into the recesses 724, the lock plates 73 restrict the terminal cover 72 from moving backward.

Adapter Mount

Figure 14:
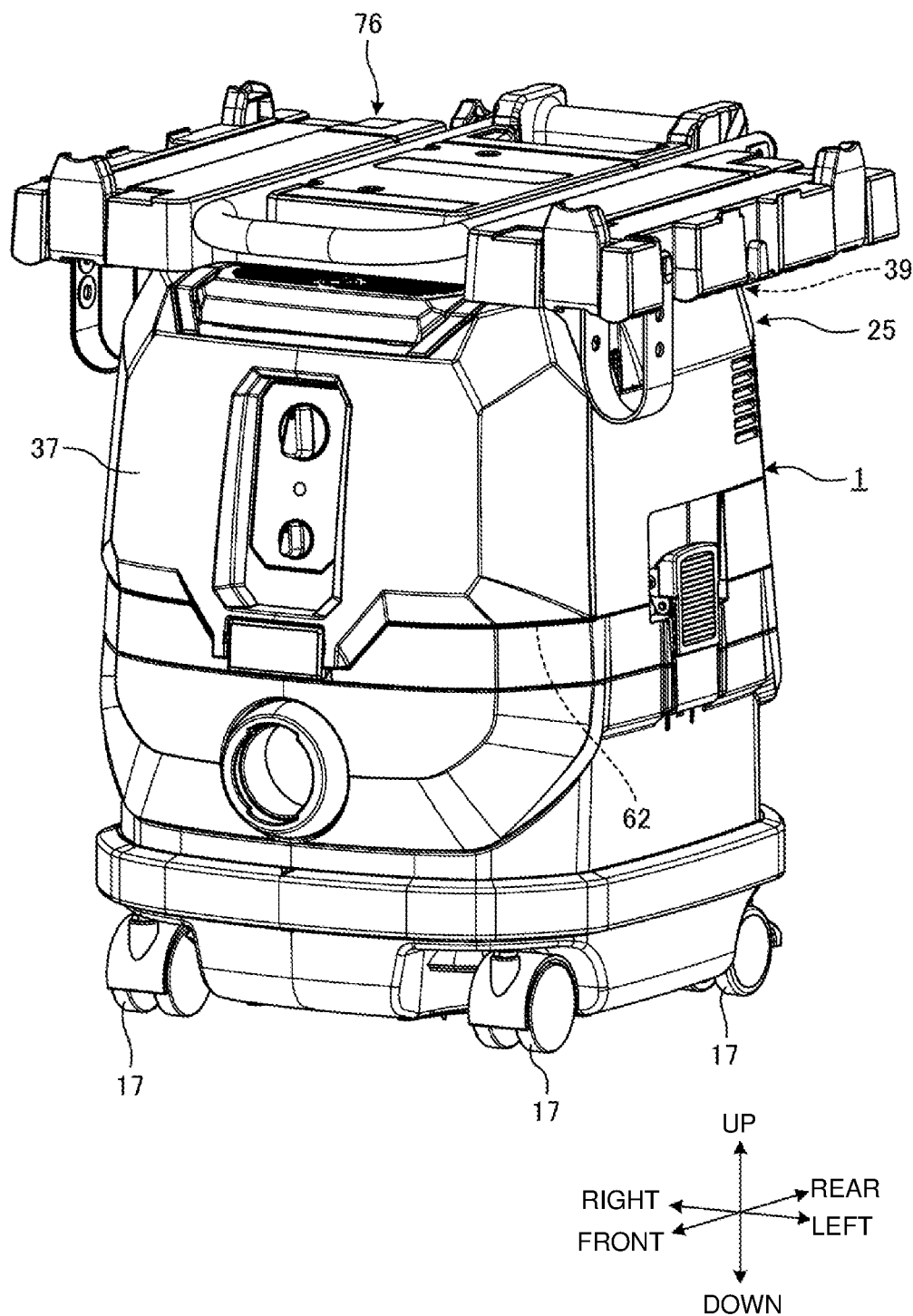
FIG. 14 is a perspective view of an adapter mount receiving an adapter in the embodiment as viewed from the left front.
Figure 15:
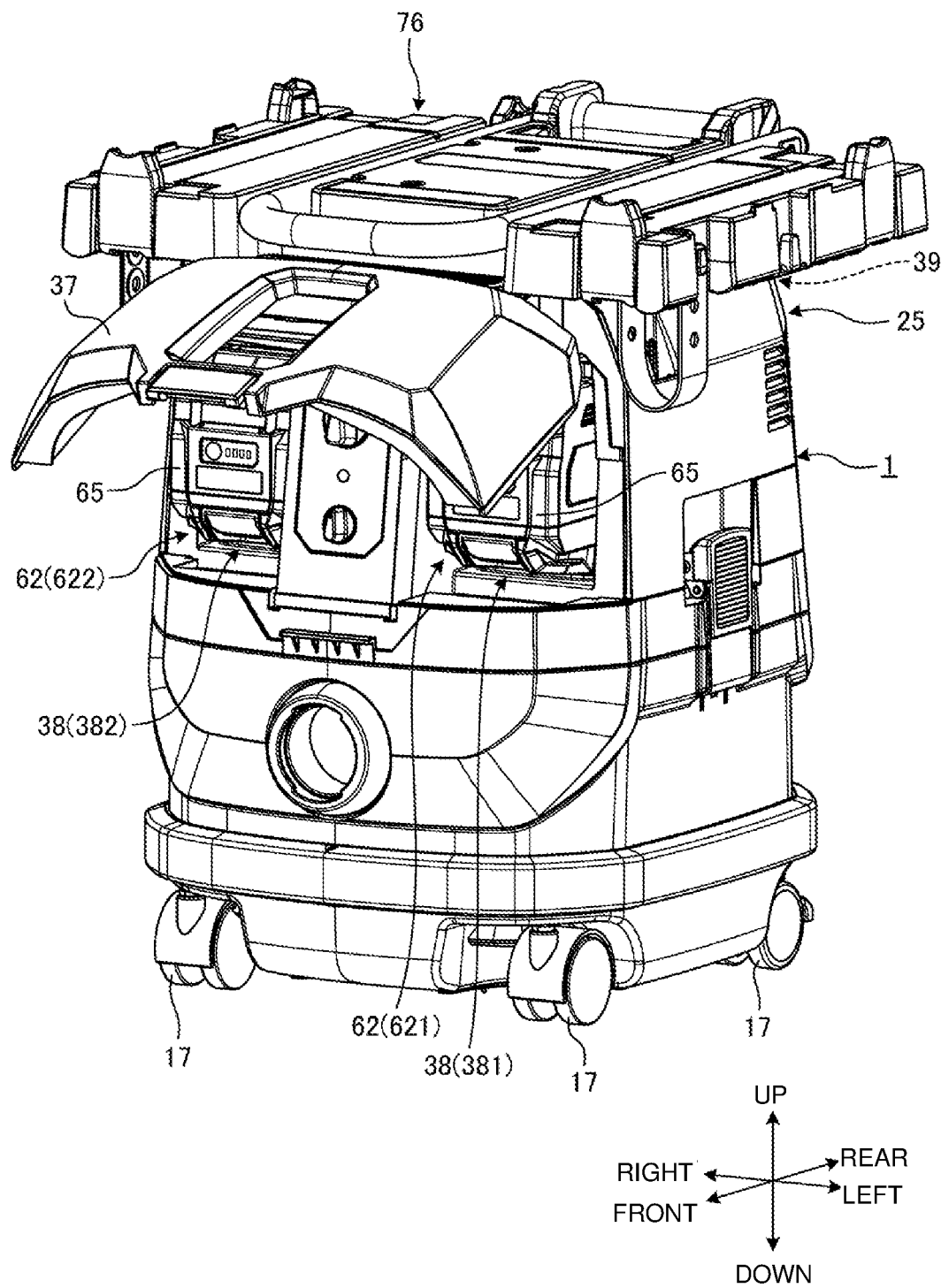
FIG. 15 is a perspective view of the adapter mount receiving the adapter in the embodiment as viewed from the left front.

FIGS. 14 and 15 are perspective views of the adapter mount 39 receiving an adapter 76 in the embodiment as viewed from the left front. FIG. 14 shows the body openings 62 being covered. FIG. 15 shows the body openings 62 being uncovered.

The adapter mount 39 is located at the top of the body housing 25. The adapter 76 is, for example, a connector to which a tool storage box is connectable.

As shown in FIG. 15, the battery cover 37 is still pivotable to uncover the body openings 62 with the adapter mount 39 receiving the adapter 76. The user can attach and detach the battery pack 65 to and from the corresponding battery mount 38 with the adapter mount 39 receiving the adapter 76.

The motor 26 and the battery mounts 38 are located in the body housing 25 in the embodiment. The battery mounts 38 and the motor 26 are arranged in the front-rear direction. The battery mounts 38 in the embodiment are located frontward from the motor 26.

The tank unit 2 has the suction port 12 in the front in the embodiment. The body 3 includes the switch base 34 at the front. The distance between the battery mounts 38 and the suction port 12 is shorter than the distance between the motor 26 and the suction port 12 in the front-rear direction. The distance between the battery mounts 38 and the switch base 34 is shorter than the distance between the motor 26 and the switch base 34 in the front-rear direction.

The battery mounts 38 to which the battery packs 65 are attachable and the motor 26 are arranged in the front-rear direction. The dust collector 1 thus has a well-balanced weight. The dust collector 1 has a well-balanced weight at least in the front-rear direction. The dust collector 1 moving on a target cleaning surface on the casters 17 is thus less likely to fall over.

Each battery mount 38 has its center located frontward from the center of the body housing 25 in the front-rear direction. The dust collector 1 thus has a well-balanced weight.

The motor 26 and the battery mounts 38 do not overlap each other in the horizontal direction. The dust collector 1 thus has a well-balanced weight. The dust collector 1 has its center of gravity closer to the center of the dust collector 1.

Each battery mount 38 includes the guides 66 that guide the battery pack 65 in the horizontal direction. The user of the dust collector 1 can attach and detach the battery pack 65 to and from the battery mount 38 by sliding the battery pack 65 in the horizontal direction. As described with reference to FIG. 15, the user of the dust collector 1 can attach and detach the battery pack 65 to and from the battery mount 38 by sliding the battery pack 65 in the horizontal direction with the adapter 76 attached to the top of the body housing 25.

The body openings 62 are located in the front of the body housing 25. The guides 66 guide the battery pack 65 in the front-rear direction. The user of the dust collector 1 can attach and detach the battery pack 65 to and from the battery mount 38 from the front of the body housing 25. As described with reference to FIG. 15, the user of the dust collector 1 can attach and detach the battery pack 65 to and from the battery mount 38 by sliding the battery pack 65 in the front-rear direction with the adapter 76 attached to the top of the body housing 25.

The body housing 25 includes the body openings 62. Each body opening 62 communicates with the corresponding battery compartment 45 in which the battery mount 38 is located. The body housing 25 includes the battery cover 37 operable to cover and uncover the body openings 62. The battery cover 37 reduces entry of foreign matter outside the body housing 25 into the battery compartments 45. The battery cover 37 protects the battery mounts 38 from dust and water.

The battery cover 37 is supported on the body housing 25 in a vertically pivotable manner. As described with reference to FIG. 15, the user of the dust collector 1 can pivot the battery cover 37 with the adapter 76 attached to the top of the body housing 25. The user of the dust collector 1 can attach and detach the battery pack 65 to and from the battery mount 38 through the body opening 62.

The switch base 34 is located adjacent to the body openings 62. This allows the user of the dust collector 1 to operate the main power switch 60 on the switch base 34 after attaching the battery pack 65 to the battery mount 38 through the body opening 62.

The switch base 34 is elongated in the vertical direction. This allows the user of the dust collector 1 to smoothly operate the main power switch 60 and the suction force adjustment switch 61 on the switch base 34.

The main power switch 60 and the suction force adjustment switch 61 are arranged in the vertical direction on the switch base 34. This allows the user of the dust collector 1 to smoothly operate the main power switch 60 and the suction force adjustment switch 61 on the switch base 34.

The battery mount 38 includes the first battery mount 381 located leftward from the switch base 34 and the second battery mount 382 located rightward from the switch base 34. The dust collector 1 thus has a well-balanced weight in the lateral direction.

The battery cover 37 includes the cover 69 operable to cover the body openings 62 and the cover opening 70 to receive the switch base 34. This allows the user of the dust collector 1 to smoothly operate the main power switch 60 and the suction force adjustment switch 61 on the switch base 34 with the cover 69 covering the body openings 62.

The adapter mount 39 is located at the top of the body housing 25. The adapter 76 is thus attachable to the top of the body housing 25.

The suction port 12 is in the front of the tank unit 2. This allows the user of the dust collector 1 to attach and detach the dust collection hose to and from the suction port 12 from the front of the tank unit 2 (the front of the body housing 25).

The casters 17 are located in the lower portion of the tank unit 2. The casters 17 allow the dust collector 1 to move smoothly on a target cleaning surface.

The dust collector 1 according to the embodiment is a wet and dry dust collector that can suck liquid as well as gas. The fan 27 includes the blowing fan 271 that generates a suction force at the suction port 12 and the cooling fan 272 that generates an airflow to cool the motor 26. Although the fan inlet 55 is closed by the float 11, the rotating cooling fan 272 can cool the motor 26.

Other Embodiments

In the above embodiment, the cooling fan 272 may be eliminated. The rotating blowing fan 271 may generate an airflow to cool the motor 26.

In the above embodiment, the dust collector 1 is a wet and dry dust collector. The dust collector 1 may be a dry dust collector.

REFERENCE SIGNS LIST 1 dust collector
2 tank unit 3 body
4 latch
5 suction tube
6 tank
7 tank housing
8 tank cover
9 lower tank cover
10 support
11 float
12 suction port
13 exhaust port
14 flow channel
15 joint
16 screw
17 caster
18 vent
19 inflow port
20 flow channel
21 screw
22 cylinder
23 plate
24 opening
25 body housing
26 motor
27 fan
28 motor housing
28L left motor housing
28R right motor housing
28S seal
29 fan base
30 fan cover
31 support ring
32 controller
33 thermal insulator
34 switch base
35 switch button
36 handle
37 battery cover
38 battery mount
39 adapter mount
40 lower housing
41 upper housing
42 separator housing
43 cowling
44 screw
45 battery compartment
46 drive unit compartment
47 stator
48 rotor
49 rotor shaft
50 bearing
51 bearing
52 motor inlet
53 motor outlet
54 seal
55 fan inlet
56 cooling inlet
57 intake channel
58 cooling outlet
59 exhaust channel
60 main power switch
61 suction force adjustment switch
62 body opening
63 lock lever
64 hook
65 battery pack
66 guide
67 body terminal
68 release button
69 cover
70 cover opening
71 base
72 terminal cover
73 lock plate
74 first coil spring
75 second coil spring
76 adapter
271 blowing fan
272 cooling fan
381 first battery mount
382 second battery mount
451 first battery compartment
452 second battery compartment
621 first body opening
622 second body opening
691 first cover portion
692 second cover portion
711 support surface
712 guide
713 hook
714 guide hole
715 opening
716 pivot
721 cover
722 lock
723 slide
724 recess
731 protrusion
732 hook

What is claimed is:

1. A dust collector that is configured to receive a first battery pack and a second battery pack in a detachable manner, the dust collector comprising:
a motor having a rotation axis in a vertical direction; and
a body housing (i) containing the motor and (ii) including:
a first battery compartment (i) frontward from the motor in a front-rear direction perpendicular to the vertical direction and leftward from the motor in a left-right direction perpendicular to the vertical and front-rear directions, (ii) having a first body opening facing frontward, and (iii) including a first battery mount configured to guide the first battery pack in the front-rear direction as the first battery pack is attached to and detached from the first battery mount through the first body opening;
a second battery compartment (i) frontward and rightward from the motor, (ii) having a second body opening facing frontward, and (iii) including a second battery mount configured to guide the second battery pack in the front-rear direction as the second battery pack is attached to and detached from the second battery mount through the second body opening;
a battery cover (i) supported on the body housing in a vertically pivotable manner and (ii) including:
a cover portion including a first cover portion configured to cover the first body opening and a second cover portion configured to cover the second body opening; and
a cover opening; and
a switch base (i) between the first body opening and the second body opening in the left-right direction, (ii)

bearing a main power switch and (iii) configured to be exposed through the cover opening when the battery cover is closed,
wherein an entirety of the switch base is directly between the first battery compartment and the second battery compartment in the left-right direction.

2. The dust collector according to claim 1, wherein the first battery mount and the second battery mount each has a center frontward from a center of the body housing in the front-rear direction.

3. The dust collector according to claim 1, wherein the motor, the first battery mount and the second battery mount do not overlap each other in the front-rear direction and the left-right direction.

4. The dust collector according to claim 1, wherein the switch base includes a suction force adjustment switch located above or below the main power switch.

5. The dust collector according to claim 1, further comprising:
an adapter mount at a top of the body housing.

6. The dust collector according to claim 1, further comprising:
a tank unit supporting the body housing, the tank unit having a suction port in a front of the tank unit.

7. The dust collector according to claim 6, further comprising:
casters supporting the tank unit in a movable manner,
wherein the tank unit supporting the body housing is movable in a front-rear direction on the casters.

8. The dust collector according to claim 6, further comprising:
a fan rotatable about the motor, the fan including
a blowing fan configured to generate a suction force at the suction port, and
a cooling fan configured to generate an airflow to cool the motor.

9. The dust collector according to claim 8, further comprising:
a fan cover having a fan inlet, the fan cover covering at least a part of the blowing fan,
wherein the tank unit includes
a tank configured to store liquid sucked in through the suction port, and
a float in an internal space of the tank, the float being movable with the liquid to close a flow channel communicating with the fan inlet.

10. A dust collector that is configured to receive a first battery pack and a second battery pack in a detachable manner, the dust collector comprising:
a motor having a rotation axis in a vertical direction; and
a body housing (i) containing the motor and (ii) including:
a first battery compartment (i) frontward from the motor in a front-rear direction perpendicular to the vertical direction and leftward from the motor in a left-right direction perpendicular to the vertical and front-rear directions, (ii) having a first body opening facing frontward, and (iii) including a first battery mount configured to guide the first battery pack in the front-rear direction as the first battery pack is attached and detached from the first battery mount through the first body opening;
a second battery compartment (i) frontward and rightward from the motor, (ii) having a second body opening facing frontward, and (iii) including a second battery mount configured to guide the second battery pack in the front-rear direction as the second battery pack is attached to and detached from the second battery mount through the second body opening; and
a switch base (i) between the first body opening and the second body opening in the right-left direction, (ii) bearing a main switch and (iii) configured to be exposed through the cover opening when the battery cover is closed,
wherein the motor, the first battery mount and the second battery mount do not overlap each other in the front-rear direction and the left-right direction.

11. A dust collector that is configured to receive a first battery pack and a second battery pack in a detachable manner, the dust collector comprising:
a motor having a rotation axis in a vertical direction; and
a body housing (i) containing the motor and (ii) including:
a first battery compartment (i) frontward from the motor in a front-rear direction perpendicular to the vertical direction and leftward from the motor in a left-right direction perpendicular to the vertical and front-rear directions, (ii) having a first body opening facing frontward, and (iii) including a first battery mount configured to guide the first battery pack in the front-rear direction as the first battery pack is attached and detached from the first battery mount through the first body opening;
a second battery compartment (i) frontward and rightward from the motor, (ii) having a second body opening facing frontward, and (iii) including a second battery mount configured to guide the second battery pack in the front-rear direction as the second battery pack is attached to and detached from the second battery mount through the second body opening;
a battery cover (i) supported on the body housing in a vertically pivotable manner and (ii) configured to cover the first body opening and the second body opening;
a switch base (i) between the first body opening and the second body opening in the left-right direction, (ii) bearing a main power switch and (iii) configured to be exposed through the cover opening when the battery cover is closed; and
an adapter mount at a top surface of the body housing.

12. The dust collector according to claim 11, wherein the adapter mount is a connector to which a tool storage box is connectable.

* * * * *